Jan. 5, 1937.  S. B. ROGERS  2,067,098
ELECTRICAL SIGNALING SYSTEM
Filed Oct. 15, 1935   5 Sheets-Sheet 1

INVENTOR
SUMNER BARNES ROGERS
By Emil Bönnelycke
ATTORNEY

Jan. 5, 1937.                S. B. ROGERS                2,067,098
                      ELECTRICAL SIGNALING SYSTEM
                        Filed Oct. 15, 1935          5 Sheets-Sheet 2
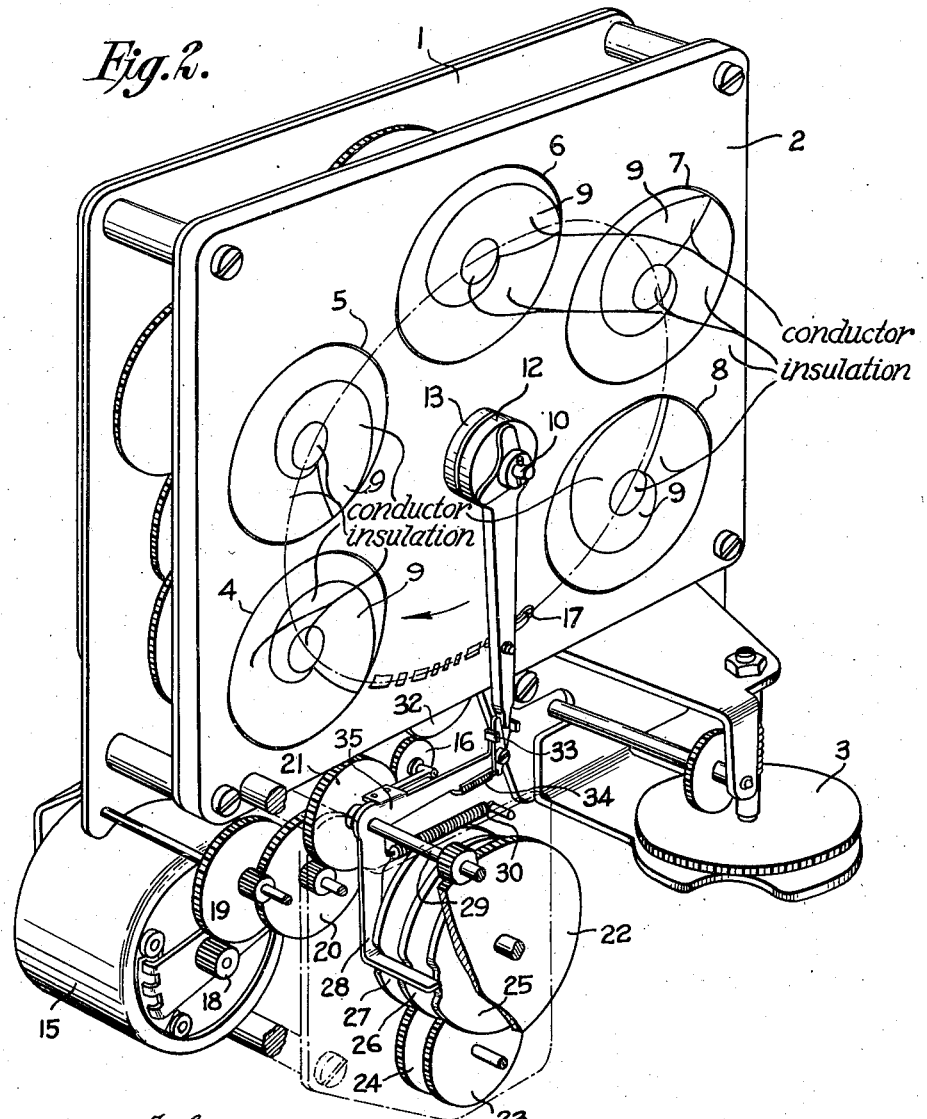
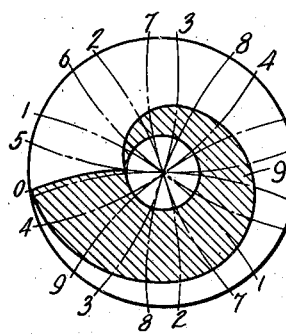
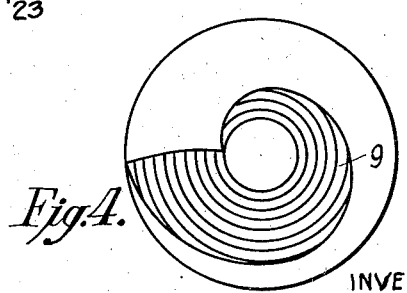
INVENTOR
SUMNER BARNES ROGERS
By Emil Bönnelycke
            ATTORNEY

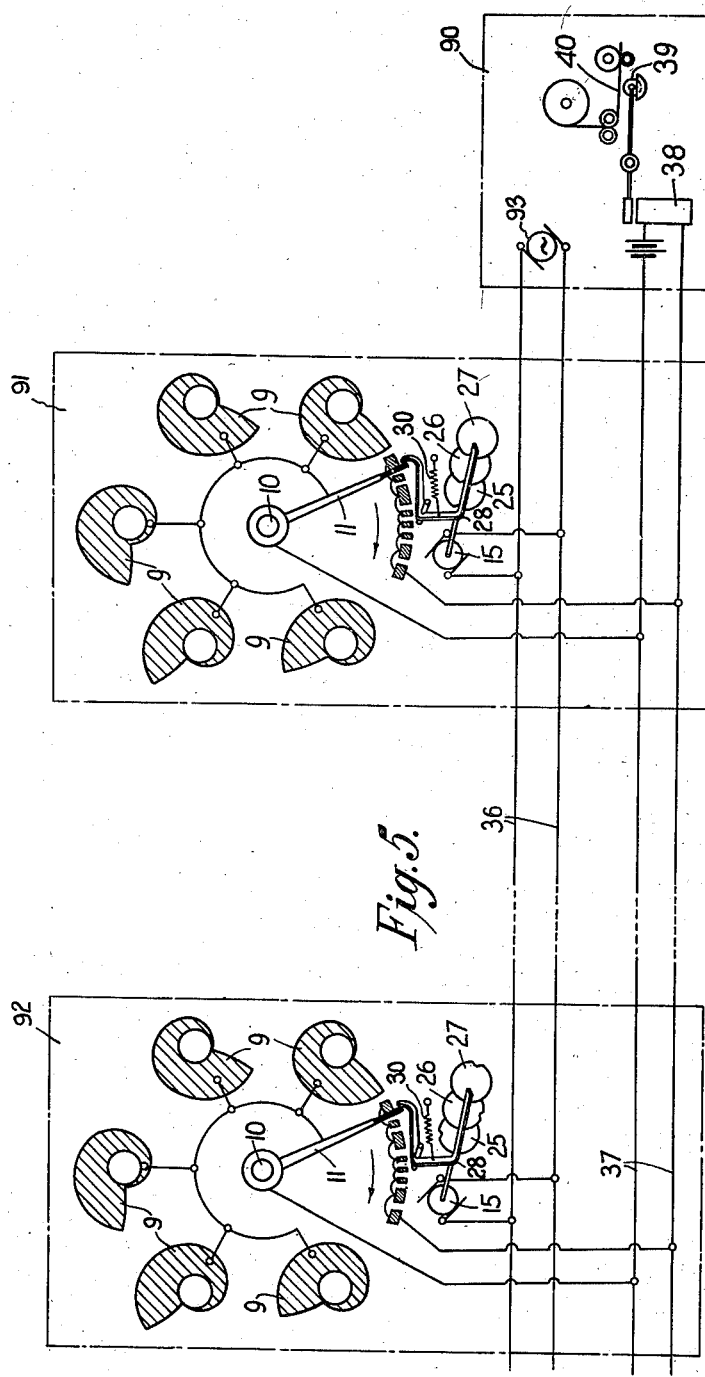

Jan. 5, 1937.  S. B. ROGERS  2,067,098
ELECTRICAL SIGNALING SYSTEM
Filed Oct. 15, 1935    5 Sheets-Sheet 4

INVENTOR
SUMNER BARNES ROGERS
By Emil Bönnelycke
ATTORNEY

Jan. 5, 1937.  S. B. ROGERS  2,067,098
ELECTRICAL SIGNALING SYSTEM
Filed Oct. 15, 1935   5 Sheets-Sheet 5
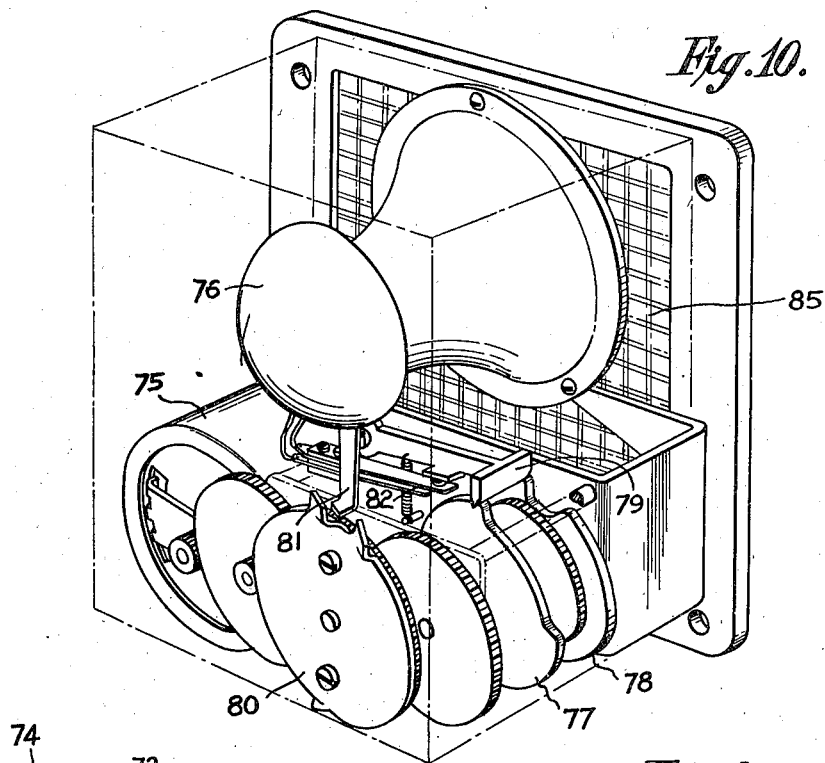
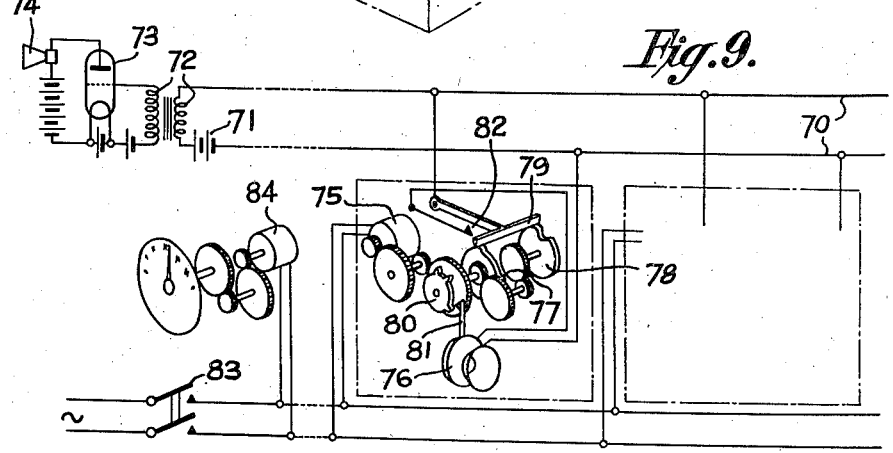
INVENTOR
SUMNER BARNES ROGERS
By Emil Bönnelycke
ATTORNEY Patented Jan. 5, 1937

2,067,098

UNITED STATES PATENT OFFICE 2,067,098

ELECTRICAL SIGNALING SYSTEM

Sumner Barnes Rogers, London, England

Application October 15, 1935, Serial No. 45,147
In Great Britain May 24, 1934

8 Claims. (Cl. 177—351)

The present invention relates to improvements in or relating to electrical signaling systems and while the principal object of the invention is to provide means whereby the meter readings of a number of gas or electricity consumers, or both, can be signaled over a common line or circuit to a central station, it is possible by means of the invention to attain other objects quite distinct from the principal object.

One of the features of the present invention concerns an arrangement whereby a very large number of stations can be connected to a common line at different instants of time so that messages and signals can be transmitted to or from the individual stations without any interference of any kind and without necessitating the provision of filtering or equivalent arrangements which are required when a plurality of messages are transmitted simultaneously over a common circuit. For this purpose synchronous motors operated from a common alternating current source such as the usual electric supply mains are provided one at each station and they are so adjusted to each other that an electrical connection to the common circuit is established by each motor at a definite time with relation to the connections established by the other motors. This particular feature of the invention, in addition to being employed for the signaling of meter readings to a central station, can also be applied to the transmission of signals corresponding to the current being consumed, or any other like data. It can also be applied for the purpose of ascertaining the condition of apparatus at different locations or for listening in at different locations or for establishing telephonic or other communication between pairs of stations at different instants of time. Other applications will readily occur to those skilled in the art of signaling and the above are only given by way of example.

Another feature of the invention concerns the provision of means whereby the position of a number of pointers or the like can be transmitted due to the single movement of a member causing them to co-operate successively with devices set in accordance with the position of the pointers so as to cause a signal to be generated signifying the position of all the pointers. Such a feature is not only applicable to the transmission of the readings of a gas or electricity meter but also could be employed for the purpose of transmitting messages by setting pointers according to the given code or message to be transmitted.

Other features of the invention will be understood by referring to the accompanying drawings which illustrate certain applications for carrying the invention into effect.

Figure 2 shows a rear view of Figure 1 in which on the same shafts as the pointers cam-shaped plates are provided, the purposes of which will be described hereinafter. In this view the synchronous motor located at the substation and the auxiliary equipment associated therewith are also illustrated.

Figures 3 and 4 illustrate alternative constructions of the cam-shaped plates.

Figure 5 illustrates diagrammatically the electrical circuit arrangements.

Figure 9 illustrates an application of the invention to listening in at a number of locations successively.

Figure 10 is a perspective view of the mechanism suitable for use with a signaling system illustrated in Figure 9.

Figure 1:
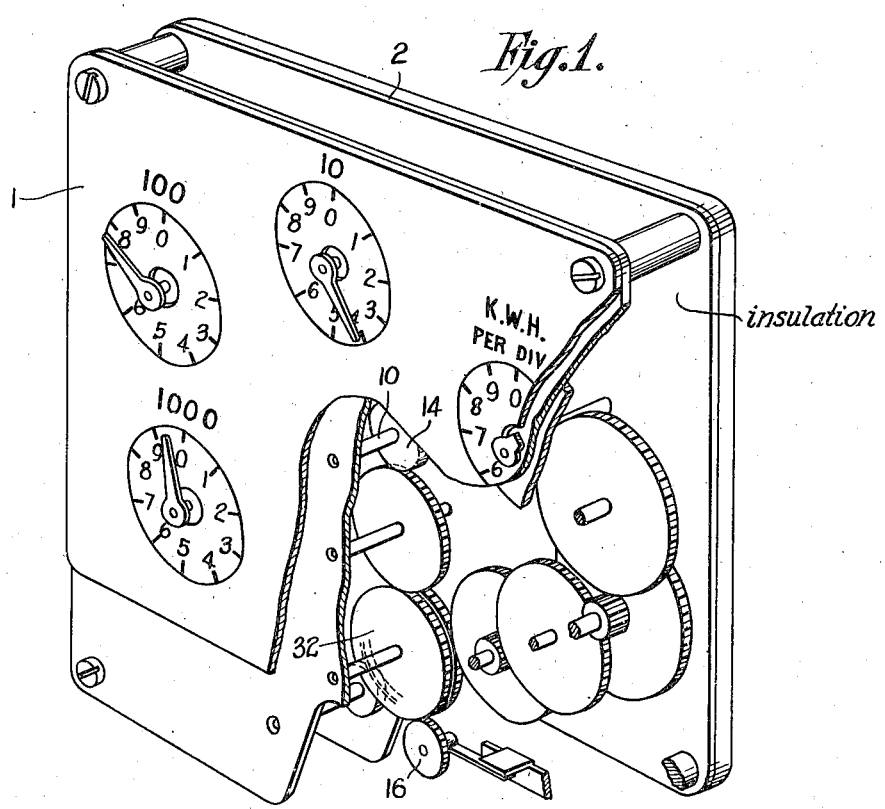
Figure 1 shows the front view of an indicator for use in connection with an electricity meter in which, for convenience in connection with the particular form of carrying out the invention described, the pointers are arranged so as to lie with their centres on the circumference of a circle, a sufficient portion of the plate being removed to show certain of the operating gear wheels.

Referring to Figures 1 and 2, I represents the front plate and 2 the back plate of the meter reading indicator, between which plates are located and mounted the gear wheels by which the different pointers are operated to record the reading of the meter with which the plates are associated. The gear wheel 3 is designed to co-operate with a known type of meter so as to be rotated at a rate corresponding to the power consumption measured by that meter and by means of suitable worm and gear wheels the movement of the meter is conveyed to shafts carrying the pointers giving the decimal points, units, tens, hundreds and thousands. The meter reads according to the position of the pointers so that in the case illustrated the reading is 9842.9. The back plate 2 is formed of insulating material of any suitable composition such as ebonite and has five circular recesses 4, 5, 6, 7, 8, each being co-axial with one of the shafts carrying the pointers. The depth of these recesses is very slight and in the recesses, cams 9 shaped as shown in greater detail in either Figure 3 or 4 and formed of thin sheet metal, are secured by suitable means to the shafts so as to take up positions corresponding to the respective positions of the pointers as the meter operates. At the centre of the circle on which the shafts carrying the pointers lie is a shaft 10 carrying a wiper arm 11 which is connected by a friction coupling 12 to a disc 13 adapted to be driven by means of a gear wheel 14 from the synchronous motor 15 when coupled therewith by means of the gear wheel 16. The wiper arm 11 carries a wiper 17 of light springy material which normally rests upon the insulating surface of the back plate 2 and is adapted when rotated by the synchronous motor to traverse successively metal plates let in to the surface of the plate 2 and of a size predetermined in accordance with the number or code allocated to a particular subscriber and the cams 9 so that the wiper when released is adapted to close a circuit for varying durations depending upon the length of the conducting surface traversed and thereby bring about the transmission of a signal comprising firstly a code corresponding to the subscriber's instrument and the signals of a length representing the reading of the various pointers.

The design of the cams 9 will be better understood by referring to Figure 3. In Figure 3 the shaded portion 9 represents the conducting plate whereas the non-shaded portion represents insulation. Normally the cam rotates with the pointer, while the path of the wiper 17 remains stationary, but in the figure it is simpler to consider the cam as stationary and to vary the position of the path relative thereto. Consequently, 1—1 represents the path of the wiper relative to the cam when the pointer is pointing to 1, 2—2 represents the path when the pointer is pointing to 2, 3—3 represents the path when the pointer is pointing to 3, and the arrangement is such that when the path is in the position 1—1 it will first make contact with a conducting arc of unit length and subsequently, if desired, with a further conducting arc whose length bears a definite relationship to unit length and serves as a check on the reading. Alternatively, if a checking signal is not desired a stationary insulating mask could be provided over which the wiper travels after passing the centre of the cam. When the path of the wiper corresponds to 2—2, then the wiper passes over a conducting arc of two units in length and a subsequent arc of length having a definite relation thereto and so on for other positions, the first arc wiped over giving a direct representation of the reading, while the length of the second conducting arc is a check on the reading of the first.

Figure 6:
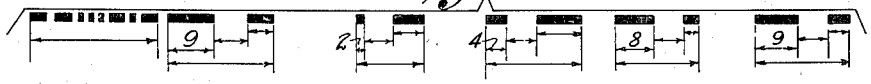
Figure 6 illustrates the signals sent over the line.

Figure 4 shows a modification of Figure 3 to the extent that instead of the whole surface of the cam being conducting, in Figure 4 the conducting surface is divided by concentric insulating rings so that instead of having to measure a length of a signal to determine what it signifies it can be readily determined by the number of impulses of which it consists. The form of signal which would be sent to the line with a cam shaped as in Figure 3 for a rotation of the wiper arm is illustrated in Figure 6 where the black lines indicate current impulses and the spaces between indicate periods during which no current is sent. It will be noted that the wiper 17 shown in Figure 2 moves in a clockwise direction and consequently will first traverse the cam on the decimal shaft, then the cam on the units shaft, then the cam on the tens shaft and then the cam on the hundreds shaft and finally the cam on the thousands shaft. Consequently if the pointers are in position giving a reading 9842.9 the current sent to the line will be, firstly the subscriber's code, secondly an impulse of nine units in length, then an impulse which serves as a check upon the ninth impulse, thirdly an impulse of two units in length followed by another checking impulse, fourthly an impulse of four units in length followed by another checking impulse, fifthly an impulse eight units in length followed by another checking impulse and finally an impulse nine units in length followed by another checking impulse.

Referring again to Figures 1 and 2, it will be understood that the synchronous motor is continuously rotating and driving the gear wheels 18, 19, 20, 21, 22, 23, and 24. Associated with the gear wheels in a suitable manner which will be understood from the foregoing explanation are discs 25, 26 and 27, each provided with a recess. The disc 25 is adapted to rotate once in a comparatively small period of time, possibly half an hour or an hour. The disc 26 might be arranged to rotate once a day. The disc 25 might be arranged to rotate once a fortnight or even a longer time and, if it was desired, to take readings once a quarter, a fourth disc could be provided as will be readily understood. By a suitable setting of the discs, which for this purpose might be frictionally mounted on their respective shafts, it would be possible to arrange that the recesses in the discs come into alignment at regular periods of time and at particular instants of time during such periods in entire dependence upon their setting. For instance, it might be arranged that for the particular meter shown in Figures 1 and 2 the reading was taken at twenty-five minutes past four on the sixth day of the fourth fortnight in a quarter. An adjacent meter might be arranged to have its reading taken at half-past four on the same day of the quarter and every other meter might be arranged so that the recesses in discs corresponding to 25, 26, 27 come into alignment at five minute intervals before or after the times mentioned so that at every five minutes throughout the quarter a different meter is connected up. Pressing against the discs 25, 26, 27 is an arm 28 bent at right-angles and pivoted about a shaft 29, a spring 30 being provided to ensure that the arm 28 is always pressing against the discs. When the critical moment arrives that the three recesses shown are in alignment then the arm 28 moves into the recesses and operates a jockey gear wheel 16 to connect the gear wheel 21 with the gear wheel 32 so as to cause the wiper arm 11 to rotate. A pivoted catch 33 controlled by a spring 34 is provided at the end of the arm 35 which is integral with the arm 28. Before the recesses in the plates 25, 26, 27 come into the position shown the arm 28 lies to the left outside the recesses so that the catch 33 normally lies with its upper nose to the right of the position shown and below the end of the wiper arm 11. When the arm 28 falls into the recesses the arm 35 and the pivot 71

33 move upwards with the catch 33 tending to press against the end of the arm 11 so that when arm 11 makes a complete revolution, its end now engages the catch 33 and moves it to the position shown where it holds the arm 11 from further movement, while the friction clutch 12 permits of the continued rotation of the gear wheel 32 and the other gear wheels without the arm 11 moving. In the course of a short interval of time which may be a minute or two, or even less, the plate 25 will move the arm 28 to the left and thereby lower the arm 35 and the catch 33, at the same time uncoupling the jockey pulley 16; preferably the arrangement will be such that the jockey pulley will uncouple the gear wheels 21 and 32 before the catch 33 passes below the end of the arm 11. Consequently the arm 11 being no longer subject to any driving torque will remain in a normal position ready for taking the next reading. In between readings the meter operates as usual in accordance with the consumption of current by the consumer and the synchronous motor, which conveniently is of the type used for operating electric clocks, continues to operate at a steady speed determined by the frequency of supply.

The interval during which the reading takes place need not be more than a few seconds but it would probably be desirable to arrange that there was an appreciable interval between the instants at which different meters were connected up so as to avoid having to make adjustments owing to some synchronous motors tending to operate slightly slowly compared with others. A synchronous motor should not slip at all but as there may be failures of supply from time to time and as different synchronous motors may take rather different times in getting into synchronism there may be a gradual creeping of one motor relative to another and over a very long period of time there may be a tendency for the times when two motors are released to approach each other and possibly overlap if a reasonable spacing is not adopted. The arrangement shown in Figure 5 illustrates diagrammatically the circuit arrangement and shows the central station 90 and two subscribers' meters 91 and 92 connected to the common circuit 37. It will of course be understood that a greater number of meters can be connected to this circuit. Each synchronous motor 15 is controlled from a common source of alternating current supply over the leads 36 which source conveniently is that of the power mains 93. The leads 36 are suitably connected to the mains in the same way as an electric clock is at present, but preferably at the main fuses, or possibly even before the main fuses so as not to be affected by a local fuse blowing. At the central station an electromagnet 38 connected in series with battery across the lines would energize each time a circuit is closed across the lines. The purpose of the electromagnet 38 is to make a record at a central station of the impulses transmitted and one diagrammatic method of doing this is by means of an undulator or telegraph inker, whereby a roller 39 is pressed against a paper strip 40 for a duration of time corresponding to the duration of pulses received. The paper strip would thereby give a complete record of the readings of every subscriber's meter connected to the line 37. It will be appreciated therefore that if readings are taken every five minutes it will be possible, seeing that only one subscriber is connected to the common line at a time, to read as many as 26,208 meters per quarter, although it will be understood that if desired the consumers' meters could be connected in groups to separate circuits such as 37, for instance it would probably be desirable to have a separate lead such as 37 extending in different directions from the central station and it may be desirable also to take readings more frequently than quarterly, for instance monthly or even weekly, in which case it would be desirable and perhaps necessary to deal with a less number of subscribers.

It will be understood that the arrangement described could be supplemented by sending other messages besides the actual meter reading, for instance if a maximum demand indicator was installed it might be possible to indicate whether the maximum demand had been exceeded or not, or possibly it may have incorporated with it an arrangement such as described in connection with Figure 8 whereby the actual current being consumed at the time of the meter reading might be measured. It will be appreciated that it is not necessary for the pointer shafts to be arranged in a complete circle as shown, as an alternative arrangement to that shown would be to arrange them along the arc of a circle or even in a straight line and allow the wiper to be restored to the normal position by a spring being moved forward against the pressure of the spring by the synchronous motor at the appropriate instant. Other alternatives will readily occur to those versed in the art and it will be understood all such constructions come within this feature of the invention, which provide an arrangement whereby a wiper arm traverses a number of devices each adapted to take up separate and distinct positions from the other devices and to send signals in accordance with such positions.

Figure 7:
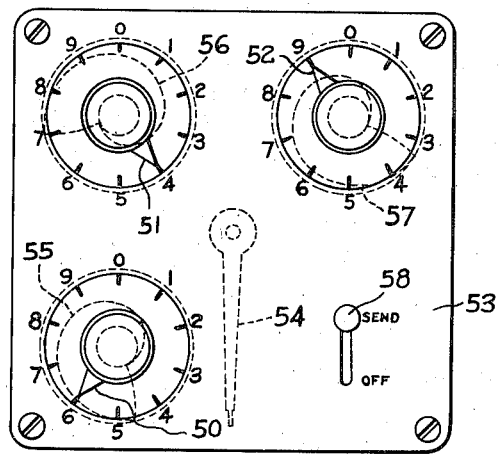
Figure 7 illustrates the application of a similar arrangement of cam-shaped plates for the transmission of messages determined by the manual setting of pointers.

Figure 7 shows the application of the invention for the purpose of sending signals other than meter readings which is also characterized by the feature of an arm traversing a number of devices each adapted to take up a plurality of separate and distinct positions in accordance with the signal to be transmitted.

Referring to Figure 7, three pointers 50, 51, and 52 are provided, each of which is adapted to be set by hand to a number or letter upon the face of the plate 53, for instance pointer No. 50 is set to 6, pointer No. 51 to 4 and pointer No. 52 to 9. The mechanical construction is similar to that shown in Figures 1 and 2, that is to say wiper 54 and cam plates 55, 56, 57 are located at the rear of the plate 53 on an insulating plate similar to the plate 2. The wiper arm 54 is also controlled in a similar manner to the wiper arm 11 by a synchronous motor associated therewith which causes certain discs similar to discs 25, 26, 27 to bring recesses on their periphery into alignment and when this happens the arm 54 is caused to travel and wipe over cam plates 55, 56, 57 and transmit signals in accordance with their position. A switch 58 may be provided which is adapted to be placed in the position marked Send when the pointers are first set and after the message has been transmitted the arm 54 operates the switch to the off position so that if the next time the wiper 54 is released and there has been no resetting of the pointers then no transmission will take place. A number of devices such as those described may be connected with a common line and might be used for the purpose of collecting information of a standardized character, such for instance as the requirements of or the consumption which has taken place at individual stations or to the code of transmission of certain kinds of intelligence. The advantage of this arrangement is that it is possible to have a very large number of stations all delivering messages over a common line without in any way interfering with one another. The circuit connections and receiving arrangement could be exactly the same as are represented in Figure 5.

Figure 8:
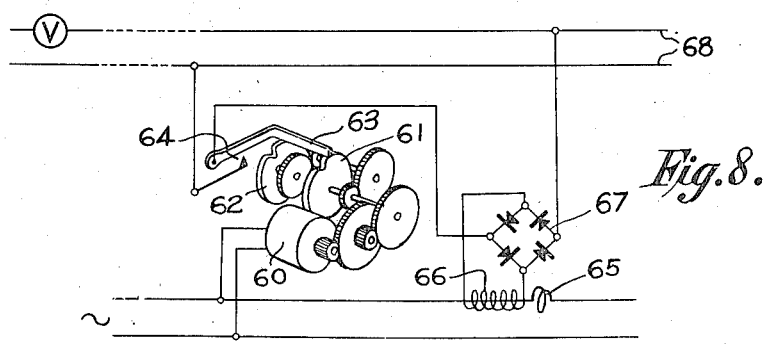
Figure 8 illustrates a circuit arrangement for transmitting a reading of the current being consumed at the subscriber's premises at the time of connecting up.

The arrangement shown in Figure 8 is an arrangement whereby at periodic intervals it is possible to ascertain the current consumption at different subscribers' stations. The synchronous motor 60 is connected across the alternating current mains and is arranged to drive through a chain of gearing, two discs 61 and 62 each having recesses arranged to come into alignment opposite a fixed pivoted arm 63 at regular periods, for instance once per day. When the discs 61 and 62 are in alignment the arm 63 falls into the recess and closes contact 64. Mains leading to the premises to be supplied pass through a transformer having a very low resistance primary coil 65 which may consist of a single turn and somewhat higher resistance secondary winding 66 consisting of a number of turns and connected across the terminals of a rectifier bridge 67, the other terminals of the bridge being connected in series with the contact 64 across common lead 68 in which is connected a direct current voltmeter V. It will thus be seen by means of the arrangement shown that periodically each subscriber's premises are connected up to the line and as the current in the secondary 66 will be a measure of the current flowing in the mains the direct current voltage produced by the rectifier bridge will give a reading on the voltmeter V at the central station of the current consumption at the time of connecting up. It will be appreciated that there will be a synchronous motor and its associated equipment such as that shown in Figure 8 connected at each subscriber's premises and that each subscriber's premises will be connected up at a different instant from the others. The voltmeter may take the form of a recording voltmeter, in which case the instant at which the readings are taken will signify the particular subscriber at any instant and thereby the current that that subscriber has taken. It is to be anticipated that the current a subscriber has taken would require to be read much more frequently than the actual meter reading, for instance it might be desirable to have a reading once per day or once per week and this could readily be arranged by connecting appropriate gearing to the discs 61 and 62. If it was desired to take a longer test of the current being consumed by any particular subscriber then this could be done by providing separate leads to the synchronous motors independent of the mains at the subscribers' premises so that the current supplied over these leads could be controlled at the central station. The manner in which this could be effected would be appreciated in connection with the description of the arrangement shown in Figure 9.

The arrangement shown in Figure 9 relates to means for audibly detecting events taking place at a large number of different locations, for instance it is possible to listen in at strategic points scattered throughout a large factory or warehouse in a very short period of time so enabling a watchman to become immediately cognizant of any untoward development taking place.

In Figure 9, 70 represents a common line extending through each location and terminating at a central office in a battery 71 in series with the primary of an induction coil 72. The secondary of the induction coil is connected to the grid of thermionic amplifier 73 having in its plate circuit a loudspeaker 74. At each location there is a synchronous motor 75, a microphone 76 and a chain of gearing for operating discs 77 and 78 at different relative speeds, so that the recesses in their periphery only come into alignment with the pivoted arm 79 at regular periods to be determined, for instance once every quarter of an hour, while the duration of the contact might be for 10 seconds. The gearing includes a code disc 80 having teeth on its periphery adapted to strike against a spring 81 connected to the casing of the microphone 76. When the recesses in the discs 77 and 78 come into alignment with the lever 79, the lever 79 falls and closes the contact 82 connecting the microphone 76 across the leads 70. A listener in the room where the loudspeaker 74 is associated will hear in code taps on the microphone caused by the teeth of the disc 80 striking against the spring 81 and he will thereby know the exact location which is connected up. He will also know that the microphone is in good listening order and in the pauses between the taps he will be able to ascertain what noises are going on in the vicinity of the microphone. Under normal conditions it will be appreciated that the different locations will be connected up successively and therefore the listener will be enabled to listen in at each location in turn. It is desirable however that if at any location he should hear sounds which may make it desirable for him to continue to listen for a longer time than that normally allowed, a switch 83 is provided by which the alternating current supply of all the synchronous motors is controlled. Normally the switch 83 will be closed but by opening it all the synchronous motors will be stopped together and therefore the location which is connected up at the instant of opening the switch 83 will remain connected up and the other disconnected as long as the listener desires. An alternative or an additional method of checking the location connected up consists of employing a synchronous electric motor 84 at the central station and arranging that this operates a pointer successively to marks indicating the respective stations. By controlling this synchronous motor 84 in the same way as the synchronous motor 75 and other synchronous motors are controlled, it will be possible to ensure that the pointer is always true. For that reason it is important to connect motor 84 in such a way as to be controlled by the opening and closing of the switch 83 in the same way as the other synchronous motors.

Figure 10 shows apparatus suitable for each substation and which could conveniently be placed in a ventilator so as to be quite out of sight if provided with a suitable cover fully protected from dust or the like. A microphone 76 is secured with its mouthpiece towards the grating 85 of the ventilator, the spring arm 81 depending therefrom and adapted to be engaged by teeth on the disc 80 as this disc rotates under the control of the synchronous motor 75. The discs 77 and 78 which control periodically the movement of the pivoted arm 79 to close the contact 82 are also driven by the synchronous motor 15 and the operation will be readily understood from the drawing.

The invention, in addition to being applicable to signaling meter readings at a distance, could also be applied to detecting the position of railway signals, circuit-breakers, turnstiles, counting devices, lamps or thermometers. It will also be appreciated that a synchronous motor at one location may be arranged to co-operate with a synchronous motor at another location so as to establish connection between the two locations independently of connections from the other locations, for instance one location might be a central station and the other a substation, or both locations might be substations. In the case of a synchronous motor being located at a central station its purpose would be to secure the connecting up of apparatus which is arranged to be individual to a particular substation which is being connected up, for instance a synchronous motor at a central station might be arranged to connect up successively recording apparatus individual to each subscriber so that this individual apparatus at the central station and the subscribers' premises would be connected together at periodic intervals.

In the case of two synchronous motors establishing connection simultaneously over a common line, this might be used for the purpose of enabling two-way communication to take place between the stations, for instance telephone communication.

It will be appreciated that voice controlled messages could be sent by means of the invention, for instance messages could be recorded on steel strips as in the telegraphone or on records as with phonographs or the like and the apparatus controlling the sending of the message at each station being started when the station is connected to the common line. Furthermore, the messages could be received on similar apparatus or by telephone receivers or loudspeakers.

I claim:—

1. In combination in an electrical signaling system, a line, a station on said line, variable contact members movable to different positions, fixed contact members indicative of said station, a movable member arranged to engage said contacts successively, a motor, coupling means forming a mechanical link between said motor and said movable member for causing said movable member to successively engage said contact members to transmit signals indicative of the station as well as of the position of said variable members, and timing means driven by said motor for controlling said driving means.

2. In combination in an electrical signaling system, a line, a measuring device, a member controlled by said device to take up variable positions in accordance with the measurement made by said device, a movable contact making member arranged to cooperate with said variably positioned member to transmit signals corresponding to the position of said member, a motor, coupling means forming a mechanical link between said motor and said movable contact making member, timing means driven by said motor for shifting said coupling means to cause said movable contact making member to be driven by said motor to transmit signals over said line at regular intervals of time indicative of the measurement made by said device.

3. In combination in an electrical signaling system, a line, a station on said line, a device at said station having a plurality of relatively movable members, a movable contact making member arranged to cooperate with said relatively movable members successively to transmit signals corresponding to the position of each of said relatively movable members, a synchronous motor, coupling means forming a mechanical link between said motor and said movable contact making member, and further means mechanically operated by the said motor to cause said movable contact making member to be effective to transmit signals over said lines at regular intervals of time indicative of the position of said members.

4. A single unit for use at a subscriber's station in an electric distribution system, comprising a kilowatthour meter, wheels provided with varying conductive signaling surfaces arranged in a circular path to take up different positions in accordance with the different digits of the total number of kilowatt hours measured by said meter, a rotatable contact making member having its axis passing through the center of said circular path and arranged so that on rotation it will successively engage the conducting surfaces of said wheels, a synchronous motor, coupling means between said motor and said rotatable member, timing means driven by said motor, and means mechanically operated by said timing means for shifting said coupling means to drive said rotatable member to transmit a signal as it traverses the conducting surfaces of said wheels, which signal is indicative of the meter reading.

5. A single unit for use at a station in an electric signaling systems, comprising a plurality of variably positioned wheels provided with varying conducting signaling surfaces and arranged in a circular path, said wheels being adapted to be set to different positions in accordance with a signal to be transmitted to interpose in said circular path conducting surfaces corresponding to the position of the wheels, a rotatable contact making member having its axis passing through the center of said circular path and arranged so that on rotation it will successively engage the conducting surfaces of said wheels, a synchronous motor, driving means between said motor and said rotatable member including a friction clutch, means for locking said rotating member in a predetermined position, and means controlled by said synchronous motor to release said locking means and permit said rotatable member to successively engage the contact surfaces of said wheels for the purpose of causing a signal to be transmitted.

6. In combination in an electrical signaling system, a line, a variably position signaling device, a movable contact making member arranged to cooperate with said variably positioned device to transmit signals corresponding to the position of said device, driving means for actuating said movable contact member, means for coupling said driving means to said contact member, and timing means driven by said driving means for actuating said coupling means.

7. In combination in an electrical signaling system, a line, a variably position signaling device, a movable contact making member arranged to cooperate with said variably positioned device to transmit signals corresponding to the position of said device, a drive shaft, an arm mounted on said shaft, an actuating member carried by said arm, means for transmitting motion from said shaft to said actuating member, and timing means driven by said shaft for shifting said arm to couple the actuating member carried by said arm with said movable contact making member to effect actuation of the latter.

8. In combination in an electrical signaling system, a line, a variably positioned signaling device, a fixed signaling device, a movable contact making member arranged to cooperate with said variably positioned device and said fixed device to transmit signals corresponding to the position of said variable device and said fixed device, driving means for actuating said movable contact member, means for coupling said driving means to said contact member, and timing means driven by said driving means for actuating said coupling means.

SUMNER BARNES ROGERS.